US007606629B2

(12) United States Patent
Haaks et al.

(10) Patent No.: US 7,606,629 B2
(45) Date of Patent: Oct. 20, 2009

(54) METHOD AND DEVICE FOR IDENTIFYING THE CAUSE OF FAILURES IN INDUSTRIAL PROCESSES

(75) Inventors: Stefan Haaks, Erlangen (DE); Gerd Michaelis, Möhrendorf (DE); Christian-Marius Wegner, Ansbach (DE)

(73) Assignee: Siemens Aktiengesellschaft, Munich (DE)

( * ) Notice: Subject to any disclaimer, the term of this patent is extended or adjusted under 35 U.S.C. 154(b) by 69 days.

(21) Appl. No.: 10/559,865

(22) PCT Filed: Jun. 9, 2004

(86) PCT No.: PCT/EP2004/006264

§ 371 (c)(1),
(2), (4) Date: Dec. 7, 2005

(87) PCT Pub. No.: WO2004/109012

PCT Pub. Date: Dec. 16, 2004

(65) Prior Publication Data

US 2006/0143547 A1    Jun. 29, 2006

(30) Foreign Application Priority Data

Jun. 10, 2003    (DE)    ................ 103 26 427

(51) Int. Cl.
G06F 19/00    (2006.01)
(52) U.S. Cl. ................ 700/122; 700/110; 700/127; 700/128
(58) Field of Classification Search ................ 700/108, 700/109, 110, 122–129; 714/47
See application file for complete search history.

(56) References Cited

U.S. PATENT DOCUMENTS

| 5,771,374 | A | 6/1998 | Burshtein et al. |
| 6,611,724 | B1 * | 8/2003 | Buda et al. ................ 700/49 |
| 6,725,123 | B1 * | 4/2004 | Denuell ................ 700/122 |
| 6,790,680 | B1 * | 9/2004 | Grover et al. ................ 438/5 |
| 6,970,857 | B2 * | 11/2005 | Card et al. ................ 706/19 |
| 7,130,709 | B2 * | 10/2006 | Popp et al. ................ 700/122 |
| 7,200,779 | B1 * | 4/2007 | Coss et al. ................ 714/48 |
| 2002/0176617 | A1 * | 11/2002 | Simonetti ................ 382/141 |
| 2005/0119854 | A1 | 6/2005 | Maier et al. |
| 2007/0043464 | A1 * | 2/2007 | Zeif ................ 700/108 |

FOREIGN PATENT DOCUMENTS

| DE | 35 39 354 A1 | 5/1987 |
| DE | 199 13 926 A1 | 9/2000 |
| DE | 199 53 189 A1 | 5/2001 |
| EP | 1 087 212 A2 | 3/2001 |
| WO | WO 03/060617 A1 | 7/2003 |

* cited by examiner

Primary Examiner—Kidest Bahta
Assistant Examiner—Nathan Laughlin (57) ABSTRACT

The invention relates to a method and a device for determining the causes of failures in industrial processes, in particular continuous processes with continuous webs, e.g. paper, textiles, plastic or metal films. Equipment and machines for industrial processes, in particular processes with continuous webs are frequently very complex combinations of drive components and automation components. As a result process failures are very difficult to detect and evaluate, among other reasons because they generally manifest themselves at different points in the equipment or machine. The present invention provides a monitoring system the monitors and measures output signals throughout the industrial process to determine if any failures will or may occur and provide data analysis to determine what caused the failure be means of the online monitoring.

8 Claims, 5 Drawing Sheets

METHOD AND DEVICE FOR IDENTIFYING THE CAUSE OF FAILURES IN INDUSTRIAL PROCESSES

CROSS REFERENCE TO RELATED APPLICATIONS

This application is the US National Stage of International Application No. PCT/EP2004/006264, filed Jun. 9, 2004 and claims the benefit thereof. The International Application claims the benefits of German application No. 10326427.2, filed Jun. 10, 2003, both applications are incorporated by reference herein in their entirety.

FIELD OF INVENTION

The invention relates to a method and a device for determining the causes of failures in industrial processes, in particular continuous processes with continuous webs, e.g. paper, textiles, plastic or metal films.

SUMMARY OF THE INVENTION

Equipment and machines for industrial processes, in particular processes with continuous webs, e.g. processes for manufacturing paper, textiles, plastic or metal films, are frequently very complex combinations of drive components and automation components. As a result process failures are very difficult to detect and evaluate, among other reasons because they generally manifest themselves at different points in the equipment or machine. For this reason, with complex processes in particular, there is no clear chain of effects between a cause and a consequence of a failure.

Sporadic failures in particular can significantly impede a process, for example limiting the manufacturing capacity of a manufacturing process and incurring significant costs. Such failures can occur as a result of a plurality of factors of a technical or technological nature, which are not major enough to interrupt production but can result in quality or throughput problems.

In extreme cases failures can however also result in process interruptions. For example in the case of a manufacturing process for a web, a break in the web ("web break") can result in interrupted production with correspondingly high downtime costs.

A conventional approach to resolving the problem for a process or equipment operator involves appointing experts for the individual sub-systems (e.g. automation system, drive system), who then use visual methods (e.g. high-speed cameras) to try to determine the cause of the failures. However in particular with complex equipment this method covers significant areas of the equipment inadequately, in particular the drive system, and the information it provides is therefore limited and generally does not result in long-term elimination of the failures.

In the German patent application with the official filing reference DE 10202092.2 and in the international patent application with the official filing reference PCT/DE/03/00093, both of the present assignee, a standard, modular extendable system is disclosed for largely retroaction-free and time-synchronous measurement and analysis of widely distributed signals from industrial processes comprising a plurality of sub-processes. Measuring heads are used to detect any signals present in the sub-processes and to time stamp them in some instances before forwarding them in a predefined form as measuring or time signals to a measuring bus system, the measuring bus system being such that it is not identical to existing bus systems used for automation. A time signal here refers to a measuring signal with a time stamp. The measuring and/or time signals are further processed by data concentrators.

The object of the present invention is to specify a method and a device for determining the causes of failures in industrial processes, which allow rapid, reproducible and economical determination of the causes of failures even in highly complex processes and also allow long-term elimination of said failures.

The object relating to the method is achieved according to the invention by a method according to the claims. The object relating to the device is achieved according to the invention by a device according to the claims. Advantageous embodiments of the method and device are the subject matter of the respective claims.

It is possible to use time and/or location correlations to identify in a simple fashion whether an effect relationship exists between a process variable and the time and/or location of a failure. The time and/or location of a failure can hereby also be identified by means of a process variable.

The process variables can be represented by measuring signals, which are understood in the sense of the patent applications DE 10202092.2 and PCT/DE/03/00093 mentioned above as signals which originate from different sources in the process and can be present in any, even different, forms e.g. analog, binary, numeric and/or as a variable physical quantity. These signals can be detected with the aid of signal sources that are already present in the process or are to be provided additionally.

In the context of the invention time correlation means that the measuring signals of two process variables show a similar response at a defined point in time. Cause determination based on time correlation is in particular possible,-when the failures are technical, e.g. instabilities or inadequate damping factors in a drive system or when the cause and effect are not too far apart spatially.

Location correlation relates to the fact that a process item undergoing a process (e.g. a continuous web) and the characteristics associated therewith (e.g. quality, size, weight) pass through the process at a defined speed and are therefore located at locationally different points of the equipment or machine at different points in time. Information about the relative positions of the measuring points in relation to each other and the speed of the process item in the process can be used to determine a time offset for every measuring point, with which the measuring point sees the process item passing through the process. The measuring signals are therefore primarily correlated by means of the process item and its characteristics. Location correlations can therefore be used in particular to determine the causes of failures of a technological nature, e.g. in a paper manufacturing process quality problems relating to weight, holes, etc.

Detection of the measuring signals and determination of the time and location correlations can be automated using appropriate data processing devices, thereby allowing rapid, reproducible and economical determination of the causes of failures. Time and/or location correlations can be used to determine effect relationships between the measuring signals and the time and/or location of the failure very precisely, so that the causes of the failures can be identified with a high level of accuracy, thereby allowing long-term elimination of failures.

The time correlations of the process variables with the time of the failure can be determined first. If no correlations are thereby established, the location correlations can then be determined. Alternatively the location correlations can be determined first and if no correlations are thereby established, the time correlations can then be determined.

If there is no significant correlation between a process variable and the failure, an effect relationship between the failure and the process variable can be excluded.

Cause can be determined particularly precisely if it is also possible to exclude as the cause those process variables for which the established correlation is a consequential effect rather than a cause of the failure.

To increase the accuracy of the cause determination further, detailed analyses can be carried out for the sub-processes with (remaining) process variables with significant correlations with the failure. This may for example require further measurements with additional/other process variables.

According to an advantageous embodiment of the invention, after the cause of the failure has been established measures are worked out to eliminate the cause of the failure. These measures can be evaluated technically and/or economically. This evaluation can be used to simplify the decision process for the implementation of improvement measures and to adopt the optimum solution for the operator of the industrial process taking the costs and benefits into account.

The outlay required to detect and analyze the process variables can be reduced by restricting the cause of the failure to one sub-process from the overall process and by only detecting process variables from this sub-process to determine the cause of the failure.

This can be done for example by transferring the principle of "cutting away" known from mechanical engineering. With this principle, in a first step only a sub-process or sub-system exhibiting the failure is considered rather than the overall process. "Cutting away" the sub-process allows the interfaces of the sub-process with the surrounding overall process to be identified and physical effects such as forces, currents, fields, pressures can be detected by measuring at these interfaces. The measuring signals for detecting these effects can in some instances be obtained by incorporating additional signal sources at these interfaces.

If during a measurement an interface signal correlates with the failure, the sub-process was too small and the sub-process must be extended to include the sub-process with which the physical effect is exchanged. The interfaces are then identified correspondingly for the extended sub-process and the physical effects are tested for correlation with the failure at these interfaces.

If an interface signal does not correlate with the failure, the cause of the failure is contained completely in the sub-process in question. The sub-process can now be reduced correspondingly to pinpoint the cause of the failure further or the measuring signals can be detected and analyzed in a detailed fashion from within the sub-process.

The cause of the failure can therefore be limited particularly simply to a sub-process, if a sub-process of the industrial process that exhibits the failure is determined, at whose physical interfaces with the remainder of the process there are no significant correlations with the failure.

The claimed method can be implemented particularly simply with a device for determining the causes of failures in industrial processes, having a detection unit for detecting process variables, as well as the time and/or location of a failure, an evaluation unit for determining correlations between the detected process variables and the time and/or location of the failure and output unit for outputting the process variables that correlate with the time and/or location of the failure.

According to an advantageous embodiment of the invention the method is implemented as a service provided by a service provider.

The invention and further advantageous embodiments of the invention according to the features of the claims are described in more detail below with reference the figures, in which:

DETAILED DESCRIPTION OF INVENTION

Figure 1:
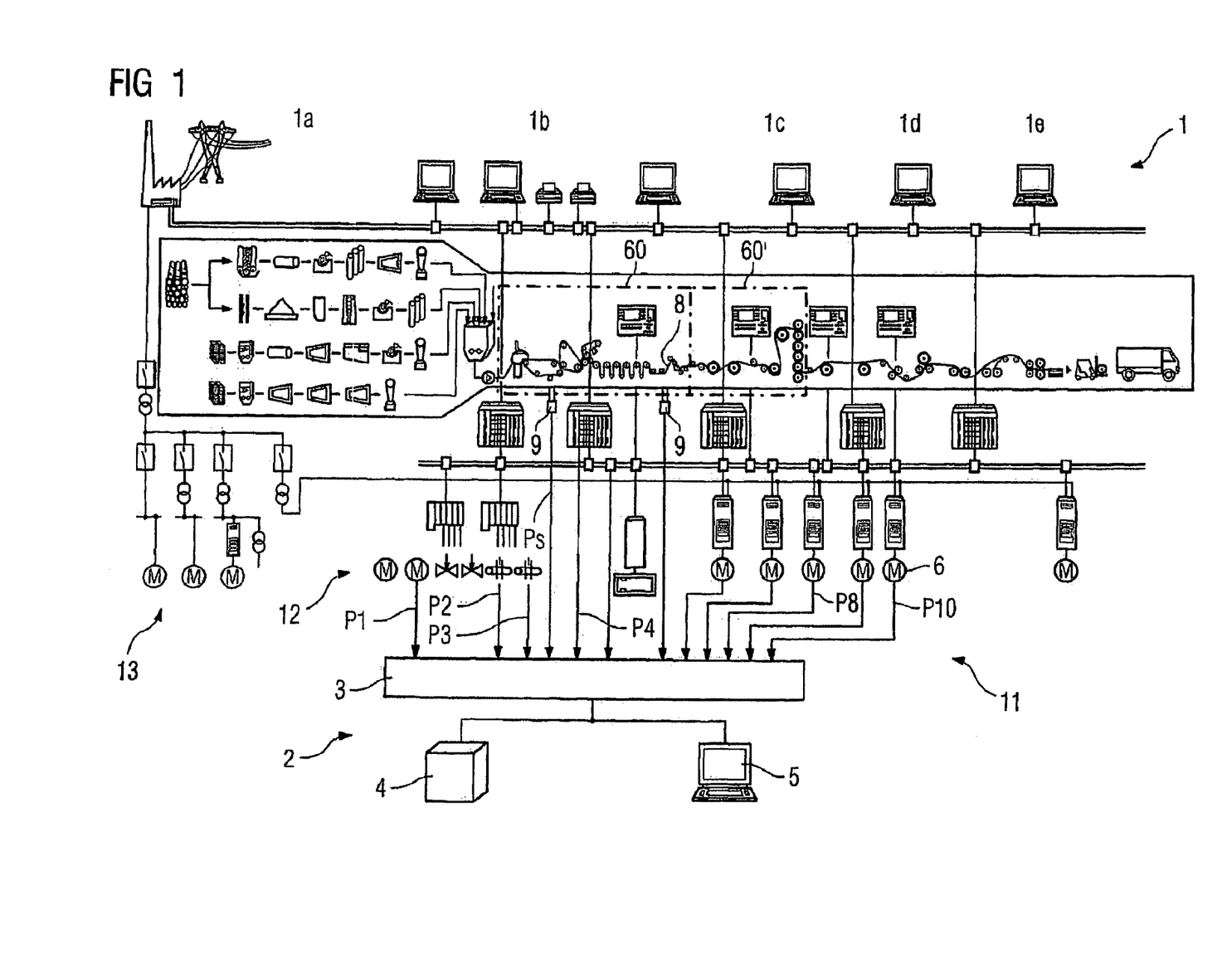
FIG. 1 shows a schematic illustration of a paper manufacturing process and a claimed device for determining the causes of failures in this process.

FIG. 1 shows equipment 1 for manufacturing paper. The equipment 1 comprises very diverse elements, required for the different steps in the paper manufacturing process, e.g. a material preparation unit 1a, a paper machine 1b, a rewinder/calendar 1c, a roll cutter 1d, a sheet cutter 1e. The paper passes through large parts of the equipment 1 in the form of a web 8. The equipment 1 has a plurality of drive components 11, automation components 12 and energy supply components 13 to drive, supply power to and control or regulate the various components of the manufacturing process.

One device 2 serves to determine the causes of failures in the equipment 1. The device 2 has a detection unit 3, an evaluation unit 4 and an output unit 5.

The detection unit 3 serves to detect process variables P1 ... P10 of the paper manufacturing process on the equipment 1. These can be measuring signals, which are detected using signal sources already present in the equipment 1 and/or to be provided. To detect breaks in the web 8, photoelectric barriers 9 for example can be provided along the web 8, which generate a signal if there is a break in the web, said signal being detected as a measuring signal PS by the device 2, allowing said device to establish the time and location of a web break. The process variables can also be signals from temperature sensors in different components of the equipment as well as current and voltages of electrical components, speeds and torques of drive components 13. Operator input and information about the paper quality can also be detected as process variables.

The evaluation unit 4 serves to determine correlations between the detected process variables P1 ... P10 and the process variable PS representing the time and location of the failure. The output unit 5 serves to output the process variables P1 ... P10 with significant correlation with the process variable PS.

The process variables can hereby be detected in the detection unit 3 in real time. The detected process variables can be evaluated on line or off line.

The detection unit 3 is preferably scalable and can detect at least 500 signals. In order to be able to detect mechanical vibration and current regulation errors as well, the sampling frequency is at least 40 kHz. For an off-line evaluation the detection unit 3 has a data storage unit (not shown in more detail) for storing a large quantity of measuring data. The device 2 can also have an input unit (not shown in more detail) for inputting a time range for the correlation considerations as well as information about the relative positions of the measuring points in relation to each other.

Figure 2:
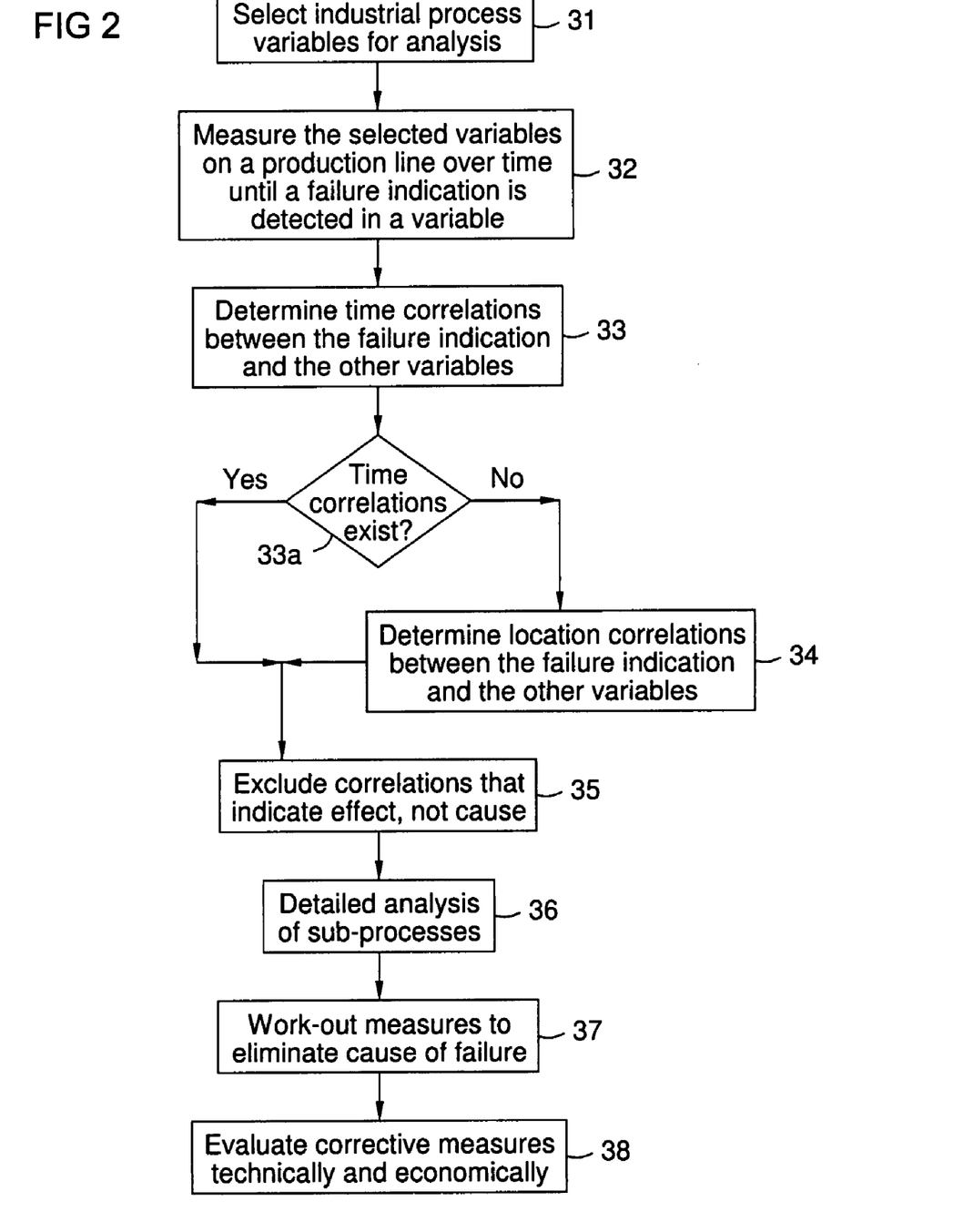
FIG. 2 shows an illustration of the claimed method for determining the causes of failures in a process according to FIG. 1 based on a flow diagram.

To determine the causes of failures, as shown in the flow diagram in FIG. 2, in a first step 31 the process variables P1 . . . P10 of relevance to the failure analysis are determined. This can be done for example by means of the method shown in more detail in FIG. 3.

The relevant process variables P1 . . . P10 are then detected by the detection unit 3 in a second step 32 over as long a period as is required to detect at least one failure. The failure is hereby identified using the process variable PS, hereafter referred to as the failure process variable.

Figure 4:
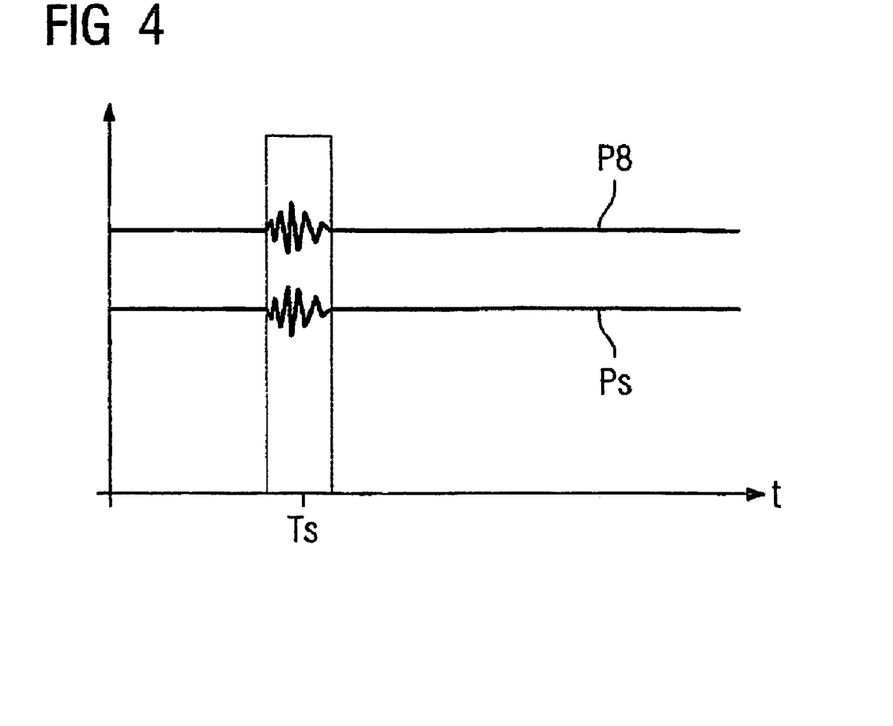
FIG. 4 shows a diagram to illustrate a time correlation between two process variables.

In a third step 33 time correlations are then determined first between the process variables P1 . . . P10 and the failure process variable PS. This is done, as shown in FIG. 4, by a comparison to establish whether a process variable, in the case of FIG. 4 the process variable P8, shows a similarly deviant response to the failure process variable PS at the time TS of the failure. If the response is temporally somewhat earlier, the process variable P8 can for the time being be considered to be the cause of the failure. If however there are other process variables that already exhibit an abnormal response at a time before the process variable P8, the process variable P8 is not the cause but a further consequence of the failure.

Figure 5:
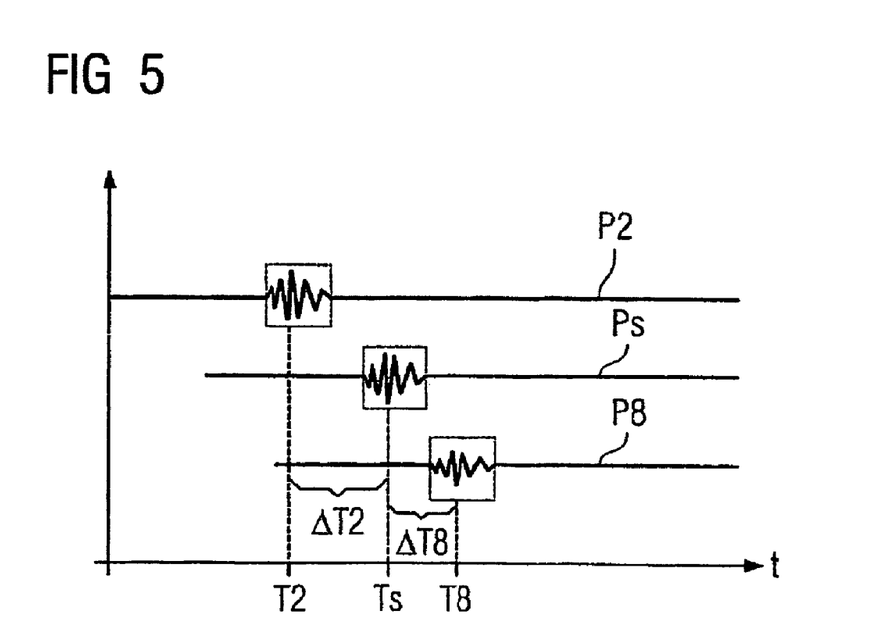
FIG. 5 shows a diagram to illustrate a location correlation between process variables.

In a step 33a it is verified whether there are time correlations. If no time correlations are established, location correlations between the process variables and the failure measuring variable PS are determined in a fourth step 34. This is done for example by determining a time offset for every measuring point with which said measuring point sees the process goods passing through the process according to FIG. 5, using information contained in the evaluation unit 4 about the relative positions of the measuring points in relation to each other and the speed of the web 8 in the process. In the example in FIG. 6 the process variable P2 has an offset $\Delta T2$ and the process variable P8 has an offset $\Delta T8$ in respect of the process variable PS. If there are deviations in the process variable P2 at time $T2=TS-\Delta T2$ or in the process variable P8 at time $T8=TS-\Delta T8$, there are location correlations of the process variables P2, P8 and PS, in other words the process variables P2, P8 and PS correlate with each other over the continuous web 8.

If there are significant time correlations between one or a plurality of process variables and the failure process variable, the process variables without significant correlation can be excluded as causes of the failure.

To determine the cause particularly precisely, in a fifth method step 35 the process variables for which the established correlation is a consequential effect rather than a cause are excluded as the cause.

In a sixth method step 36, to increase the precision of the cause determination further for the sub-processes, which are represented by the remaining process variables with significant correlations with the failure, detailed analyses are carried out which allow the cause of the failure to be located.

In a seventh method step 37, after the cause of the failure has been established, measures are worked out to eliminate the cause of the failure. These measures are finally evaluated technically and/or economically in an eighth method step 38.

Figure 3:
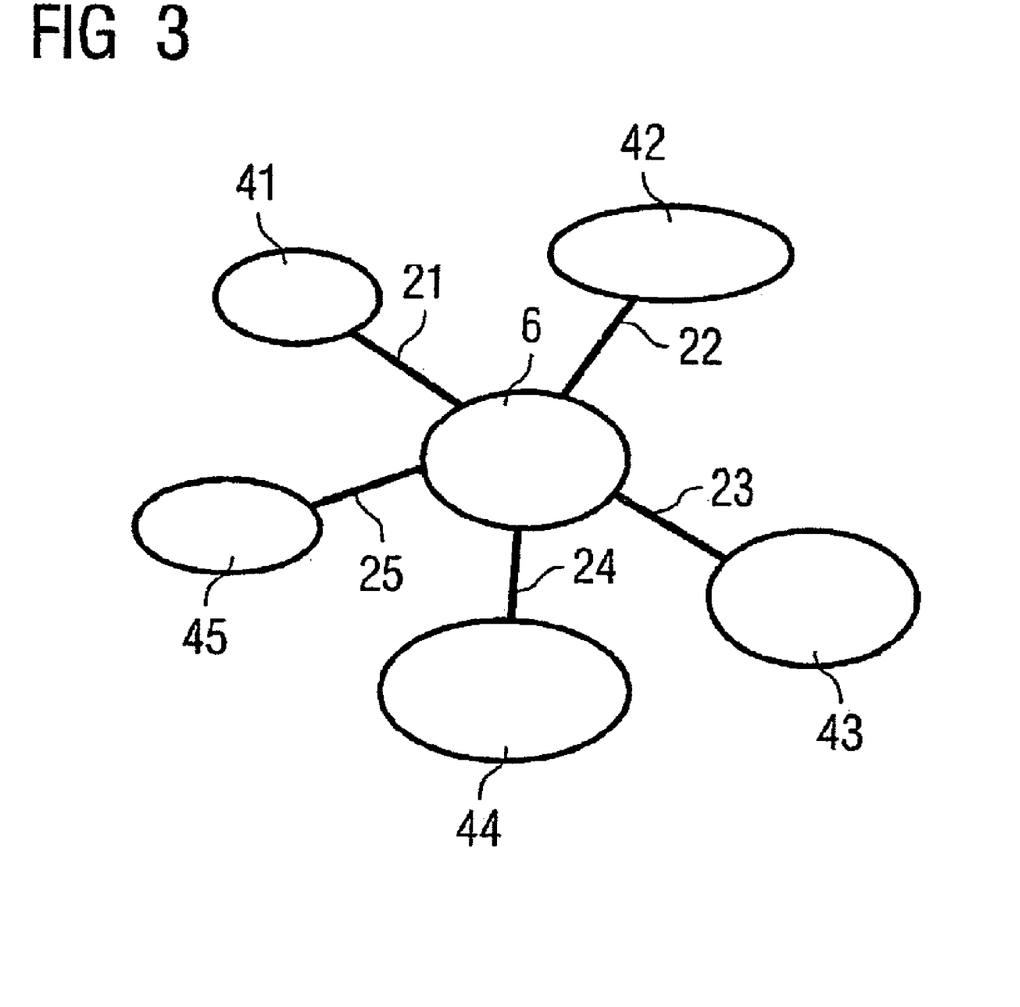
FIG. 3 shows an illustration to describe the method for determining the process variables of relevance to a cause determination.

To determine the relevant process variables, a sub-process subject to failure, shown as 6 in FIG. 3, is defined and all connections or interfaces 21 to 25 between the sub-process 6 and the remainder of the process, in the case in FIG. 3 the sub-processes 41-45, are identified using the "cutting away" method known from technical areas of mechanical engineering and the physical effects such as forces, currents, fields, pressures, are detected by measuring at these interfaces 21-25. The physical effects at these interfaces therefore describe the interaction of the sub-process 6 with the sub-processes 41-45 of the overall process.

Examples of the connections or interfaces 21-25 and physical effects may be: connections between an equipment element of the sub-process and a base, which on the one hand bears the weight of the element and on the other hand also transmits vibrations from other sub-processes to the element,
  drive shafts, cylinders or similar moving parts of an element, which apply mechanical forces to the element or its parts,
  pipes or cables for hydraulic, pneumatic or electrical connections between the sub-process and its environment,
  material supplied to the sub-process from other sub-processes,
  operator actions, which bring about a change in settings or other characteristics of the sub-process.

If web breaks are detected by the signal source 9 in the paper machine 1b in the equipment 1 according to FIG. 1, the sub-process 60 shown with a broken line can be considered in a first step and its interfaces with the material preparation unit 1a, the rewinder/calendar 1c and the energy supply 13, the drive system 11 and the automation unit 12 can for example be considered.

In the event of an exchange of a physical effect at an interface with the rewinder/calendar 1c, i.e. correlation of an interface signal to the rewinder/calendar 1c with the failure, the sub-process 60 was too small and the sub-process 60 must be extended to include the sub-process 60' of the rewinder/calendar 1c.

The interfaces are then correspondingly identified for the extended sub-process, i.e. the sub-process comprising the sub-processes 60 and 60', and the physical effects are then checked at said interfaces for correlation with the failure.

If there is no correlation between an interface signal and the failure, the cause of the failure is contained completely in the extended sub-process and measuring signals from within the extended sub-process can now be detected and evaluated in detail.

The method can be used particularly advantageously to determine cause when the failures are sporadic failures in a continuous production process or breaks in webs.

A particularly suitable method and device for detecting the process variables and for determining the correlations must receive signals from a large number of sources, whereby the spatial distribution of the sources can be very wide. Measuring signals must be detected precisely with the same high level of quality and must also be able to support high sampling rates. The device must be such that it can be tailored in a flexible manner to different equipment configurations; simple and rapid commissioning is expected for low wiring and configuration outlay as is simple operation, like the plug and play principle. Retroaction-free signal detection is particularly important.

The processes in question are often present in industrial equipment, which generally comprise a plurality of mostly spatially distributed equipment components. It is therefore particularly important to be able to carry out precise correlation considerations even with spatially widely distributed measuring points and the resulting delays in detecting the measuring signals in a central detection unit.

The processes in question are mostly controlled and/or regulated with at least one automation device. The signals to be detected and processed can originate from diverse sources and be present in any, even different, forms, e.g. analog, binary, numeric form as video signals and/or as changing physical variables.

A method and a device that satisfy these requirements to a particularly significant degree and are therefore particularly suitable for detecting the process variables and determining the correlations are described in the as yet unpublished patent applications DE 10202092.2 and PCT/DE/03/00093.

The method and device are standard and modular in structure. The underlying concept is the separation of measuring and analysis on the one hand and control and regulation on the other hand. The implementation of the concept primarily allows largely retroaction-free signal detection and realization of a versatile, high-performance standard system of the type mentioned above that can be extended in a modular and economical manner.

In a preferred embodiment of the method at least one measuring head receives measuring signals on the input side from any bus system. This allows the largely retroaction-free receipt of signals exchanged via the bus system and/or the analysis of signal failures at the bus system itself.

Advantageously the method can be configured such that at least one measuring head forwards measuring signals on the output side directly to a data concentrator, thereby enhancing the modularity of the system further.

According to a further advantageous embodiment of the method, the measuring heads and/or data concentrators are identified automatically. According to a further advantageous embodiment the communication between data concentrators and measuring heads is set up automatically with the aid of at least one communication unit. Both embodiments correspondingly enhance the modularity of the method, which can be extended very simply in this manner with little cost and outlay.

In a preferred embodiment of the method time signals are generated by time-stamping measuring signals. This simplifies evaluation of the detected measuring signals significantly, in particular for correlation considerations and particularly in respect of complex relationships extending over a plurality of sub-processes.

The method is advantageously extended such that at least one measuring head receives a standard time signal. Use of said time signal as a reference time allows clear and precise temporal assignment of measuring signals across the boundaries of the industrial process, to which the advantageous method relates.

In a further embodiment the standard time signal from a Global Positioning System (GPS) is detected. The advantage of this embodiment is the worldwide availability of GPS and the low costs associated with the detection of this standard time signal.

According to a further advantageous embodiment of the method the time and/or measuring signals originating from at least one data concentrator are processed with the aid of at least one programmable evaluation unit, whereby the programmable evaluation unit can be at any spatial distance from the sub-processes. This increases the flexibility and universal use of the method. Particularly economical utilization of resources is achieved by the conceptual task allocation provided for the data concentrators and evaluation units.

The method can preferably be configured such that at least one display unit is used to display data generated from the measuring signals and/or time signals, whereby the display unit can be at any spatial distance from the sub-processes. Such an extension enhances the modularity and flexibility of the claimed method, the spatial independence of the display unit from the industrial processes also allowing functionalities such as remote analysis, thereby increasing both the efficiency and economy of the intellectual evaluation of measuring results and significantly facilitating the use of expert knowledge for evaluation purposes.

The method can be carried out with a device for detecting and processing signals from industrial processes, which comprise at least one sub-process, the industrial process being controlled and/or regulated by at least one automation device equipped with one or a plurality of bus systems.

The advantageous device is characterized in that at least one measuring bus system is provided, which is not identical to the bus system(s) of the automation device, and that at least one measuring head is provided to detect measuring signals, connected on the input side to signal sources of the industrial process that are already present and/or to be provided additionally and on the output side forwarding signals in a predefined form to the measuring bus system, and that one or a plurality of data concentrators are connected to the measuring bus system.

In an advantageous embodiment of the device at least one measuring head, which is connected to a signal source supplying a standard signal, is attached to the upper end of a device, within which or with the aid of which the industrial process is implemented.

Such attachment allows better receipt of the standard time signal, in so far as this is transmitted wirelessly and in particular using not exclusively earth-bound transmission devices, such as satellites for example.

According to a further advantageous embodiment of the device, the data concentrators can be extended such that the required number of measuring bus systems and/or measuring heads can be connected thereto in each instance. This allows uncomplicated integration of measuring bus systems and/or measuring heads in a time and cost saving manner. It allows the system to be extended simply in any manner.

Figure 6:
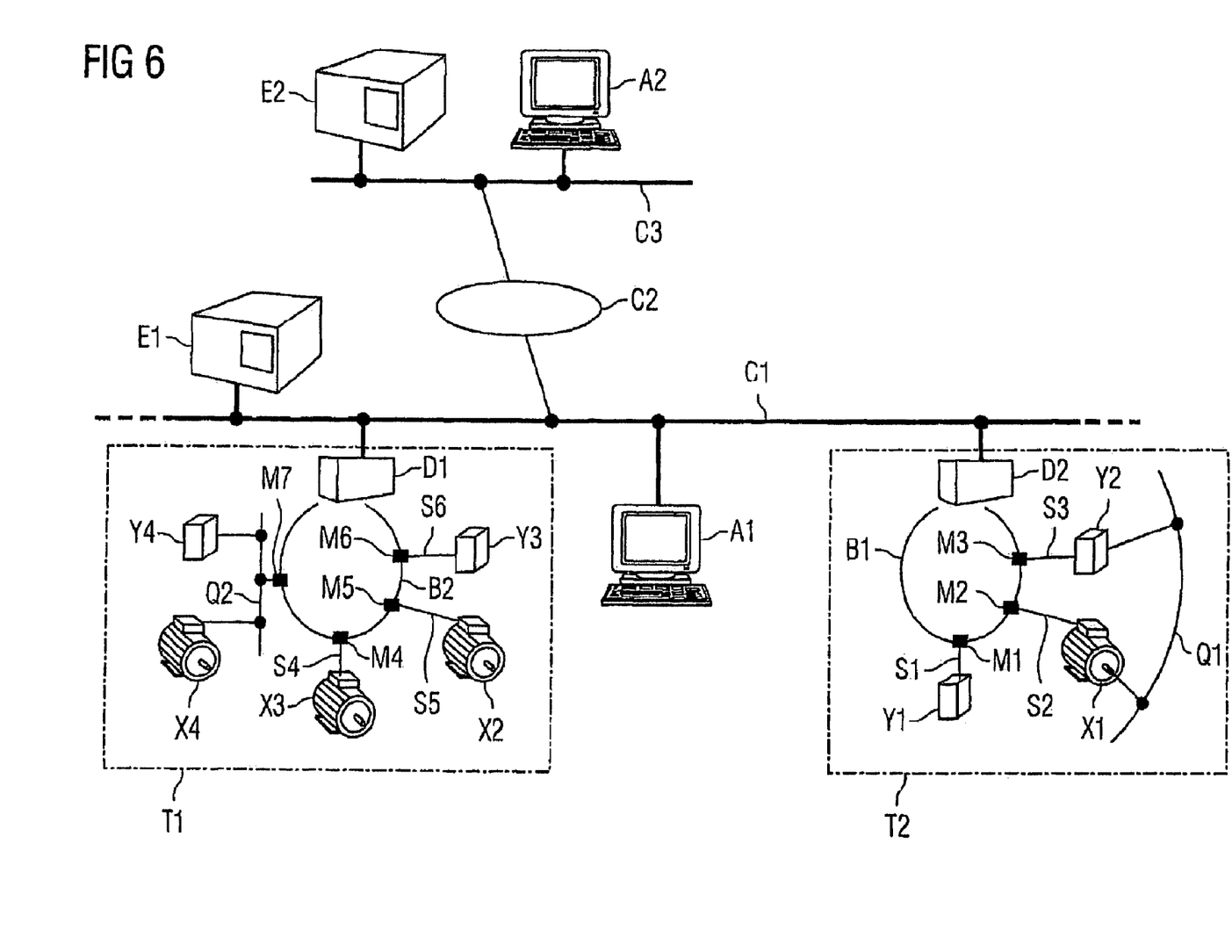
FIG. 6 shows a schematic illustration of a measuring and analysis system as described in the patent applications DE 10202092.2 and PCT/DE/03/00093.

FIG. 6 shows a schematic illustration of a measuring and analysis system described in the patent applications DE 10202092.2 and PCT/DE/03/00093. In the example shown the process is divided into two sub-processes T1 and T2. Signals are to be detected and processed within said sub-processes T1 and T2.

Signal sources S1 to S6 connected to corresponding measuring heads M1 to M6 are located at the equipment components X1 to X3 and Y1 to Y3. The equipment components shown by way of an example in the drawing are the motors X1 to X4 and the switchgear cabinets Y1 to Y4.

There are the bus systems Q1 and Q2 and further bus systems (not shown in more detail) to be assigned to the automation device of the industrial processes T1 and T2. The bus systems Q1 and Q2 are used to control and regulate the equipment components X1 and Y2 or X4 and Y4. As shown by way of an example at the bus system Q2 and the measuring head M7, measuring heads can also be connected to bus systems, which serve to control and regulate.

The measuring heads M1 to M7 are connected on the output side to the data concentrators D1 and D2 with the aid of the measuring bus systems B1 and B2. One task of the data concentrators D1 and D2 is to process the time and/or measuring signals of the measuring heads M1 to M7.

The evaluation units E1 and E2 are provided for further signal and data processing. The display units A1 and A2 allow measuring data processed by the data concentrators D1 and D2 or the evaluation units E1 and E2 to be displayed. The evaluation units E1 and E2, the display units A1 and A2 and the data concentrators D1 and D2 are connected to each other via local and/or spatially unlimited data transmission networks C1 to C3.

In the exemplary embodiment time signals are generated by time-stamping measuring signals with a synchronously operating time stamp.

The measuring heads M1 to M7 are designed such that they receive numeric, binary or analog signals from signal sources. Also provided but not shown in the drawing are measuring heads, which detect physical measuring variables such as vibration duration or temperature. Measuring heads can be connected to bus systems serving to control and regulate such as PROFIBUS or CAN bus. The measuring head M7 connected to the bus system Q2 detects data present on the bus system Q2, which can be used to analyze signal failures on the bus system Q2 or to provide further measuring data provided that this is done in a largely retroaction-free and accurately timed manner. The term accurately timed means synchronously in the resolution of half the minimum sampling time.

All the measuring heads M1 to M7 comprise a standard bi-directional communication element and have the functionalities for independent detection and generation of the measuring data and drivers for receiving data from the data concentrator. The measuring bus systems B1 and B2 use a standard transmission protocol and are based in a standard manner on optical waveguide technology to ensure minimum cabling and configuration outlay and a high level of insensitivity to interference.

It is possible (although not shown in more detail) for measuring heads to be connected directly to a data concentrator D1 or D2. The arrangement comprising a data concentrator and attached measuring head then provides a unit, which in some instances is associated with space and cost savings. The data concentrators D1 and D2 are designed such that they can be extended in respect of the number of measuring bus systems B1 and B2 to be connected or measuring heads to be directly attached.

Each of the data concentrators D1 and D2 contains at least one computer unit and at least one communication unit.

The task of the communication unit is the independent, automatic operation of the measuring bus systems B1 and B2 of the device, setting up communication with the connected measuring heads M1 to M7 via the measuring bus systems B1 and B2 and automatic detection of the components in the system and automatic monitoring of the compatibility of individual components. In every communication unit a structure storage matrix is provided, in which there is a unique address for every measuring head assigned to the data concentrator and every assigned measuring or time signal. The communication units also allow automatic synchronization of the measuring processes for all measuring heads and all the data concentrators present in the system on a common time basis. Communication units have means for self-diagnosis, means for inserting external signals and the functionality for automatic load distribution between the data concentrators used in the system.

The task of the computer unit is to process time and measuring signals. The computer unit carries out temporal vectorization of the incoming data and archives the vectors on read-only memories to prevent data losses. The task of the computer unit is also to take into account different sampling rates, smooth the measuring signals and if necessary interpolate to common sampling times.

The evaluation units E1 and E2 have functionalities for more extensive processing of measuring and time signals from different data concentrators D1 and D2. The evaluation units E1 and E2 are user-programmable by means of a graphic editor and have a library of functionalities for example for filtering or transforming measuring signals or signal vectors.

The display units A1 and A2 can be used to display selected measuring data graphically in real time. The evaluation units E1 and E1 and the display units A1 and A2 can be accessed locally and by means of spatially limited or unlimited data transmission networks. The evaluation units E1 and E2 support automatic monitoring, in that they transmit reports in the event of predefined data constellations to trigger an alarm for example at at least one of the display units A1 and A2. This can be done for example with the aid of an email or even with the aid of a short message via a mobile radio network.

While the measuring bus systems B1 and B2 are designed in a standard manner based on optical waveguide technology, this is not the case for the data transmission networks C1 to C3. In the drawing the data transmission networks C1 and C3 represent local networks with a high transmission rate using the TCP/IP protocol family. The data transmission network C2 clearly extends further spatially and represents a digital telecommunication network.

Problems that extend beyond individual sub-processes T1 and T2 can be reliably identified and analyzed with the aid of the data concentrators D1 and D2 and the evaluation units E1 and E2 and display units A1 and A2 provided in a spatially remote manner from the sub-processes T1 and T2. Problem analysis and an understanding of relationships are thereby facilitated for external experts in that measuring signals are provided with a time stamp based on a standard system time and in some instances itself standardized, going beyond simple synchronization of the measuring signals.

The measuring bus systems B1 and B2 and the measuring heads M1 to M7 can be simply tailored in the event of modifications within the industrial process to the new circumstances resulting from the modification or can be correspondingly extended. The decoupling of the measuring and analysis devices from existing automation devices of the industrial process also allows not only a high level of freedom from retroaction when detecting measuring data but also uniform measuring data detection and analysis in the event of modifications within the industrial process. This allows direct comparison and analysis of process features before and after a modification.

The invention claimed is:

1. A method for determining causes of failures in industrial processes, comprising:
    selecting a plurality of distinct industrial process variables for analysis;
    measuring the selected variables at selected measuring points on a production line over time until a failure indication is detected in a first of the selected variables;
    detecting an abnormal deviation in one or more others of the selected variables;
    determining a time correlation between the failure indication and each abnormal deviation;
    finding an upstream location on the production line that is a source of a failure by correlating the first of the selected variables with the other selected variables having abnormal deviations, and projecting backwards in time to a convergence of the first and other variables in time or location on the production line;

determining a cause of the failure indication without a need for detecting a second failure;

working-out corrective measures to eliminate the cause of the failure indication;

evaluating the corrective measures technically and economically;

selecting and implementing an optimum one of the corrective measures on the production line;

wherein the production line comprises an automation system and control bus that automate the production line, and wherein the measuring of at least some of the selected variables is performed directly from at least some of the measuring points on the production line without passing through the control bus; and wherein the production line produces a continuously moving web of material.

2. The method of claim 1, further comprising determining a relative time offset for each of the selected measuring points based on a speed of the web passing through the production line, and applying the time offsets to the selected variables to correlate deviations in the selected variables that are offset in time to locate a position of a failure on the production line.

3. The method of claim 1, wherein the measuring step comprises time-stamping samples of the selected variables using a time signal from a global positioning system receiver connected to the measuring and evaluation system.

4. The method of claim 1, wherein the evaluation system continuously performs elimination routines to isolate variables directly related to the failure to determine the location on the production line of the failure.

5. The method according to claim 1 further comprising determining if a sub-process in the industrial process is the location of the failure to determine the cause of the failure.

6. The method according to claim 5 further comprising determining if the cause of the failure is located in the sub process, and evaluating the sub process to determine a root cause of the failure.

7. The method according to claim 1 further comprising communicating correlation data to a service provider that provides service in the event of a failure in the industrial process to correct the failure.

8. The method according to claim 1 comprising:

determining correlations between the selected variables and the time and location of the failure by time-correlating an effect of the failure detected in the selected variables with a location on the production line of a cause of the failure based on a production speed, without a need for detecting a second failure; and outputting the selected variables correlating with the time and location of the failure.

* * * * *